US009683083B2

United States Patent
Sivasubramanian et al.

(10) Patent No.: US 9,683,083 B2
(45) Date of Patent: Jun. 20, 2017

(54) CATALYST FOR SYNTHESIS OF SILOXANES

(71) Applicant: MOMENTIVE PERFORMANCE MATERIALS INC., Waterford, NY (US)

(72) Inventors: Karthikeyan Sivasubramanian, Bangalore (IN); Patricia Pike Anderson, Williamstown, MA (US); Vivek Khare, Bangalore (IN)

(73) Assignee: MOMENTIVE PERFORMANCE MATERIALS INC., Waterford, NY (US)

( * ) Notice: Subject to any disclaimer, the term of this patent is extended or adjusted under 35 U.S.C. 154(b) by 0 days.

(21) Appl. No.: 14/914,864

(22) PCT Filed: Aug. 18, 2014

(86) PCT No.: PCT/US2014/051410
§ 371 (c)(1),
(2) Date: Feb. 26, 2016

(87) PCT Pub. No.: WO2015/031085
PCT Pub. Date: Mar. 5, 2015

(65) Prior Publication Data
US 2016/0215097 A1    Jul. 28, 2016

Related U.S. Application Data

(60) Provisional application No. 61/872,066, filed on Aug. 30, 2013.

(51) Int. Cl.
*C08G 77/08*    (2006.01)
*B01J 31/02*    (2006.01)

(52) U.S. Cl.
CPC .......... *C08G 77/08* (2013.01); *B01J 31/0251* (2013.01); *B01J 2231/14* (2013.01)

(58) Field of Classification Search
CPC ......... C07F 7/21; C08K 5/5435; C08G 77/08; B01J 31/0251
See application file for complete search history.

(56) References Cited

U.S. PATENT DOCUMENTS

| 5,504,234 A | 4/1996 | Omura et al. |
| 5,883,215 A | 3/1999 | Bischoff et al. |
| 6,221,993 B1 | 4/2001 | Currie et al. |
| 2002/0035230 A1* | 3/2002 | Gilson ............... B01J 14/00 528/10 |
| 2005/0080215 A1 | 4/2005 | Baceiredo et al. |
| 2006/0155089 A1 | 7/2006 | Ferenz et al. |
| 2008/0097064 A1 | 4/2008 | Blanc-Magnard et al. |
| 2011/0003081 A1 | 1/2011 | Maton et al. |
| 2012/0053290 A1 | 3/2012 | Barnes et al. |

OTHER PUBLICATIONS

Pratt, R. et al., "Triazabicyclodecene: A simple bifunctional organocatalyst for acyl transfer and ring-opening polymerization of cyclic esters." Journal of American Chemical Society. vol. 128 2006 pp. 4556-4557.
Penczek, S. et al., "Living ring-opening polymerizations of heterocyclic monomers." Progress in Polymer Science. vol. 32 2007. pp. 247-282.
Simon, L. et al., "The mechanism of TBD-catalyzed ring-opening polymerization of cyclic esters." Journal of Organic Chemistry. vol. 72 No. 25 2007. pp. 9656-9662.
Patent Cooperation Treaty (PCT), International Search Report and Written Opinion for Application PCT/US2014/051410 filed Aug. 18, 2014, mailed Nov. 28, 2014, International Searching Authority, US.

* cited by examiner

*Primary Examiner* — Kuo-Liang Peng
(74) *Attorney, Agent, or Firm* — Jim Abruzzo; McDonald Hopkins LLC

(57) ABSTRACT

The present technology provides compositions, methods, and processes to form polysiloxanes. In one aspect, the present technology provides a process for the ring opening polymerization of a cyclosiloxane comprising contacting a cyclosiloxane with a bicyclic guanidine compound. The guanidine-containing compounds useful in the ring opening reaction include a fused ring structure comprising a guanidine functional group as part of the fused ring.

16 Claims, No Drawings

CATALYST FOR SYNTHESIS OF SILOXANES

CROSS REFERENCE TO RELATED APPLICATIONS

This application claims priority to and the benefit of International Application No. PCT/US2014/051410, entitled "Catalyst for Synthesis of Siloxanes," filed Aug. 18, 2014, which claims priority to and the benefit of U.S. Provisional Application No. 61/872,066, entitled "Catalyst for Synthesis of Siloxanes," filed Aug. 30, 2013, the disclosures of which are each incorporated herein by reference in its entirety.

FIELD

The present technology relates to methods of forming siloxanes using a guanidine-containing compound as a catalyst. The guanidine-containing compound comprises a guanidine functional group as part of a fused ring system and may be used in ring opening polymerization reactions.

BACKGROUND

Cyclosiloxanes are often used as starting monomers to form polysiloxanes. Generally polysiloxanes may be formed by the ring opening polymerization of cyclosiloxanes and a suitable end-capping unit. The reaction is carried out in the presence of a catalyst.

Various catalysts are known for the polymerization of cyclosiloxanes. Examples are alkali metal hydroxides, alkali metal alkoxides or complexes of alkali metal hydroxides and an alcohol, alkali metal silanolates, and phosphonitrile halides (sometimes referred to as acidic phosphazenes). Such polymerizations may be carried out in bulk, in solvents (such as non-polar or polar organic solvents) or in emulsion. Phosphazene bases and carbenes have been described as suitable catalyst for the ring opening polymerization of siloxanes. An endblocking agent may be used to regulate the molecular weight of the polymer and/or to add functionality. Polymerization may be terminated by using a neutralizing agent which reacts with the catalyst to render it non-active. In most cases, catalyst residues remain in the polymer product and are desirably removed, such as by filtration.

Solid type catalysts may be used as a catalyst to synthesize polydimethylsiloxane (PDMS) fluids and PDMS functional fluids by ring opening polymerization. Solid type catalysts exhibit high catalytic activity, but generate solid waste. The solid waste is typically incinerated. Additionally, the solid waste contains a significant fraction of the product, which decreases the overall yield and may increase production costs.

SUMMARY

The present technology provides compositions, methods, and processes to form polysiloxanes.

In one aspect, the present technology provides a process for the ring opening polymerization of a cyclosiloxane comprising contacting a cyclosiloxane with a bicyclic guanidine compound. The guanidine-containing compounds useful in the ring opening reaction include a fused ring structure comprising a guanidine functional group as part of the fused ring.

In one embodiment, the guanidine-containing compound is of the formula:

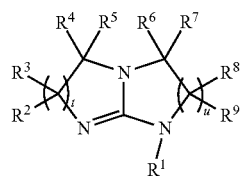

where $R^1$, $R^2$, $R^3$, $R^4$, $R^5$, $R^6$, $R^7$, $R^8$, and $R^9$ are independently chosen from hydrogen, a linear or branched alkyl comprising 1 to 10 carbon atoms, an aromatic group comprising 6 to 12 carbon atoms, or one or more of the $R^2$-$R^9$ may be eliminated and replaced with a double bond between successive carbon atoms; and t and u are independently 1-5.

In one embodiment, the bicyclic guanidine compound is chosen from a compound of the formulas:

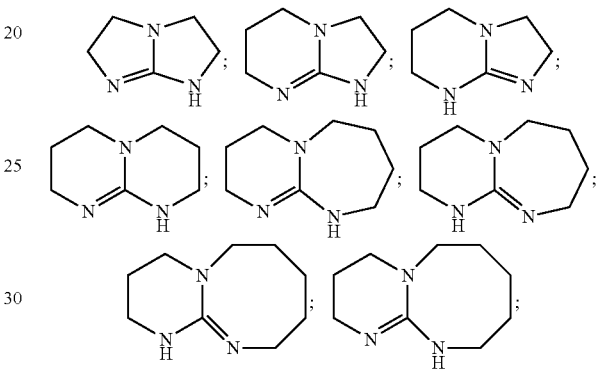

or a combination of two or more thereof.

In one embodiment, the bicyclic guanidine compound is of the formula:

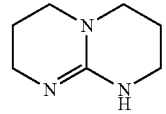

In one embodiment, the bicyclic guanidine is present in an amount of from about 0.05 weight percent to about 5 weight percent based on the total weight of the cyclosiloxane.

In one embodiment, the bicyclic guanidine is present in an amount of from about 0.1 weight percent to about 0.4 weight percent based on the total weight of the cyclosiloxane.

In one embodiment, the cyclosiloxane is of the formula $(R^{10}R^{11}SiO)_n$, wherein $R^{10}$ and $R^{11}$ are independently chosen from hydrogen or an optionally substituted alkyl, alkenyl, aryl, alkaryl or aralkyl group having up to 8 carbon atoms, n denotes an integer with a value of from 3 to 12.

In one embodiment, the cyclosiloxane is chosen from octamethyl cyclotetrasiloxane (D4), hexamethylcyclotrisiloxane (D3), octaphenylcyclotetrasiloxane, tetramethylcyclotetrasiloxane, tetramethyltetravinylcyclotetrasiloxane, hexamethyl-1,1-diphenylcyclotetrasiloxane, decamethyl pentacyclosiloxane, cyclopenta (methylvinyl) siloxane, cyclotetra(phenylmethyl) siloxane, cyclopenta methylhydrosiloxane, or a combination of two or more thereof.

In one embodiment, the process comprises two or more cyclosiloxanes or silanol terminated poly(dimethylsiloxane), where at least two cyclosiloxanes have a different ring size from each other.

In one embodiment, the reaction comprises an endblocker material.

In one embodiment, the endblocker material is chosen from hexamethyldisiloxane; octamethyltrisiloxane; decamethyltetrasiloxane; dodecamethylpentasiloxane; tetradecamethylhexasiloxane; hexadecamethylheptasiloxane, or a combination of two or more thereof.

In one embodiment, the process further comprises deactivating the catalyst.

In one embodiment, deactivating the catalyst comprises treating the product with water; bubbling carbon dioxide through the product; treating the product with a material to neutralize the catalyst, or a combination of two or more thereof.

In one embodiment, the process further comprises filtering the reaction mixture.

These and other aspects of the technology are further illustrated with respect to the following description.

DETAILED DESCRIPTION

Ring Opening Polymerization

The present technology provides, in one aspect, a process for the ring opening polymerization of cyclosiloxanes. The process comprises contacting a cyclosiloxane with a guanidine-containing compound. Guanidine-containing compounds with a guanidine functionality in part of a fused ring system may be suitable for catalyzing the ring-opening polymerization of cyclosiloxanes. The reaction may be carried out in a suitable solvent. The reaction may also be carried out in the presence of water to the extent that the catalytic activity of the catalyst does not deteriorate.

As used herein, the guanidine-containing compounds comprising a guanidine functional group as part of a fused ring system may also be referred to as bicyclic guanidine compounds.

The guanidine-containing material may be chosen from a compound of the Formula (1):

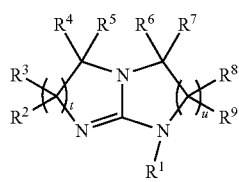

(1)

where $R^1$, $R^2$, $R^3$, $R^4$, $R^5$, $R^6$, $R^7$, $R^8$, and $R^9$ are independently chosen from hydrogen, a linear or branched alkyl comprising 1 to 10 carbon atoms, an aromatic group comprising 6 to 12 carbon atoms, or one or more of the $R^2$-$R^9$ may be eliminated and replaced with a double bond between successive carbon atoms; and t and u are independently 1-5. Suitable alkyl groups include, but are not limited to, methyl, ethyl, propyl, butyl, pentyl, hexyl, octyl, isopropyl, isobutyl, etc. Suitable aromatic groups may include, but are not limited to, phenyl, benzyl, naphthyl, etc.

In one embodiment, the bicyclic guanidine compound may be chosen from a compound of Formulas (2)-(9) or a combination of two or more thereof:

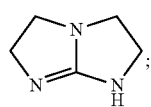

(2)

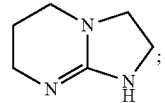

(3)

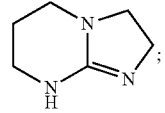

(4)

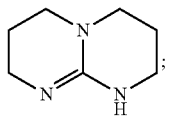

(5)

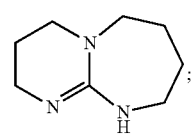

(6)

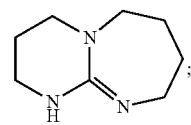

(7)

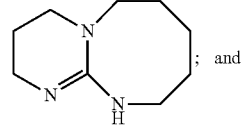

; and (8)

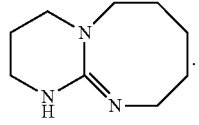

(9)

One or more different guanidine-containing compounds with a guanidine functional group as part of a fused ring system may be used as the catalyst material in the ring opening polymerization process.

The polymerization may be carried out in bulk or in the presence of a solvent. Suitable solvents may be alcohol-based solvents. The bicyclic guanidine catalyst may be diluted in an alcohol solvent, such as methanol or ethanol. Where the bicyclic guanidine catalyst is initially in a solvent such as hexane, the hexane may be removed by evaporation under vacuum, and the catalyst dispersed in a silicone fluid to give a stable clear solution. The reaction may include water, but of a concentration that will not result in deactivation or deterioration of the catalyst.

The polymerization reaction may be carried out at ambient temperature or under heating.

The time taken for polymerization may depend on the activity of the catalyst in the chosen system, and on the desired polymer product. In the absence of moderation, the bicyclic guanidine catalysts may be sufficiently active to convert cyclosiloxanes, such as D4, to high molecular weight polysiloxane gums within a few hours.

The starting material for the polymerization comprises a cyclosiloxane (also known as a cyclic siloxane). The cyclosiloxane has the general formula $(R^{10}R^{11}SiO)_n$, wherein $R^{10}$ and $R^{11}$ are independently chosen from an alkyl, alkenyl, aryl, alkaryl, or aralkyl group having up to 8 carbon atoms, which may be unsubstituted or substituted, and n denotes an integer with a value of from 3 to 12. $R^{10}$ and $R^{11}$ may be substituted, e.g., by a halogen such as fluorine or chlorine. The alkyl group may be, e.g., methyl, ethyl, n-propyl, trifluoropropyl, n-butyl, sec-butyl, and tert-butyl. The alkenyl group may be, e.g., vinyl, allyl, propenyl, and butenyl. The aryl and aralkyl groups may be, e.g., phenyl, tolyl, and benzoyl. In one embodiment, at least 80% of all $R^{10}$ and $R^{11}$ groups are methyl or phenyl groups; at least 85% of all $R^{10}$ and $R^{11}$ groups are methyl or phenyl groups; 90% of all $R^{10}$ and $R^{11}$ groups are methyl or phenyl groups; 95% of all $R^{10}$ and $R^{11}$ groups are methyl or phenyl groups. In one embodiment, substantially all $R^{10}$ and $R^{11}$ groups are methyl or phenyl groups and in another embodiment, all $R^{10}$ and $R^{11}$ groups are methyl or phenyl groups. Here, as elsewhere in the specification and claims, numerical values may be combined to form new and non-disclosed ranges.

When $R^{10}$ and $R^{11}$ are methyl, the compound is referred to as Dn; e.g., where n is 4, the compound is called D4. The value of n may be from 3 to 6, or from 4 to 5. Examples of suitable cyclosiloxanes include, but are not limited to, octamethyl cyclotetrasiloxane (D4), hexamethylcyclotrisiloxane (D3), octaphenylcyclotetrasiloxane, tetramethylcyclotetrasiloxane, tetramethyltetravinylcyclotetrasiloxane, hexamethyl-1,1-diphenylcyclotetrasiloxane, decamethyl pentacyclosiloxane, cyclopenta (methylvinyl) siloxane, and cyclotetra(phenylmethyl) siloxane. One particularly suitable commercially available material is a mixture of octamethylcyclo-tetrasiloxane and decamethylcyclopentasiloxane.

In one embodiment, the reaction mixture comprises two or more cyclosiloxanes. In one embodiment, the reaction mixture comprises a mixture of at least two cyclosiloxanes of different ring sizes. In one embodiment, at least one of the cyclosiloxanes comprises one or more functional groups chosen from vinyl, amine, etc.

The reaction mixture is generally purged with inert gas, preferably nitrogen, prior to addition of the catalyst so as to remove any dissolved $CO_2$. Because of the extremely rapid reaction, the reaction mixture is vigorously mixed to ensure homogenous dispersion of the catalyst. Inadequate mixing may result in the catalyst being encapsulated in beads of gum as it is added to the reaction, and the catalyst may then take some time to diffuse out of the gum particles, providing a slower reaction.

The bicyclic guanidine catalyst may be present in an amount of from about 0.05 weight percent to about 5 weight percent; 0.1 weight percent to about 4 weight percent; 0.25 weight percent to about 3 weight percent; 0.4 weight percent to about 2 weight percent; even from about 0.5 weight percent to about 1 weight percent, based on the weight of the starting cyclosiloxane material. Here, as elsewhere in the specification and claims, numerical values may be combined to form new and non-disclosed ranges. In one embodiment, the bicyclic guanidine catalyst is present in an amount of from about 0.1 weight percent to about 0.4 weight percent based on the weight of the cyclosiloxane material.

The process may further comprise adding an endblocker material. The endblocker material is generally not limited and can be chosen as desired for a particular purpose or end use. In one embodiment, the endblocker material is chosen from hexamethyldisiloxane; octamethyltrisiloxane; decamethyltetrasiloxane; dodecamethylpentasiloxane; tetradecamethylhexasiloxane; hexadecamethylheptasiloxane, or a combination of two or more thereof.

Additionally, the process may further comprise deactivating the catalyst. Deactivating the catalyst may comprise removing the catalyst from the reaction system. The catalyst may also be deactivated by treating the reaction system with water, bubbling carbon dioxide through the system, and/or treating with an agent to neutralize the bicyclic guanidine compound. One or more of the above deactivation operations may be employed to deactivate the catalyst. Suitable acids to neutralize the catalyst may include, but are not limited to, mineral acids and ion exchange resins. The present catalysts may provide an advantage over other solid type catalysts that require filtering the solid particles dispersed in the reaction medium.

Following deactivation, the reaction system may be treated as desired or necessary to remove any color present in the system. Such treatments may include filtering the sample such as through a celite bed, treating with charcoal, etc.

The catalysts for the synthesis of siloxanes described above may be further understood with reference to the following Examples.

EXAMPLES

Ring Opening Polymerization of Cyclosiloxanes

The ring opening polymerization of a cyclosiloxane was performed with a mixture of octamethylcyclotetrasiloxane (D4), alcohol terminated poly(dimethylsiloxane) and hexamethyldisiloxane with triazabicyclo[4,4,0]dec-5-ene (also called TBD) as a catalyst. The catalyst was provided at loadings ranging from 0.1 wt. % to 1.4 wt. %. All reactions were conducted under nitrogen atmosphere. The catalyst as added as a solid or as an aqueous/methanolic solution. Comparative examples employed a heterogeneous catalyst and a base type catalyst. The results are provided in Table 1.

Example 1

Octamethylcyclotetrasiloxane (100 grams, 0.335 moles) and hexamethyldisiloxane (0.82 grams, 5.3 mmol) were taken in a round bottom flask fitted with a water cooling condenser. The catalyst triazabicylo[4,4,0]dec-5-ene (0.4 grams) was added. The reaction mixture was kept in an oil bath maintained at 100° C. Samples ere taken periodically and the volatile content of the sample was recorded to monitor the extent of reaction. A volatile content of 14% as measured after 4 hours of reaction.

Example 2

Octamethylcyclotetrasiloxane (100 grams, 0.335 moles) and hexamethyldisiloxane (0.82 grams, 5.3 mmol) ere taken in a round bottom flask fitted with a water cooling condenser. The catalyst triazabicylo[4,4,0]dec-5-ene (0.1 grams) as added. The reaction mixture was kept in an oil bath maintained at 100° C. After 2.5 hours, the reaction temperature was increased to 120° C. and the reaction mixture was kept at that temperature for 24 hours. Samples were taken periodically and the volatile content of the sample was recorded to monitor the extent of reaction. A volatile content of 28.1% was measured after 24 hours of reaction.

Example 3

Octamethylcyclotetrasiloxane (100 grams, 0.335 moles) and hexamethyldisiloxane (0.82 grams, 5.3 mmol) were taken in a round bottom flask fitted with a water cooling condenser. The catalyst triazabicylo[4,4,0]dec-5-ene (0.4 grams in 1 ml of water) was added. The reaction mixture was kept in an oil bath maintained at 100° C. Samples were taken periodically and the volatile content of the sample was recorded to monitor the extent of reaction. A volatile content of 15.5% was measured after 8 hours of reaction.

Example 4

Octamethylcyclotetrasiloxane (100 grams, 0.335 moles) and hexamethyldisiloxane (0.82 grams, 5.3 mmol) were taken in a round bottom flask fitted with a water cooling condenser. The catalyst triazabicylo[4,4,0]dec-5-ene (0.4 grams in 2 ml of methanol) was added. The reaction mixture was kept in an oil bath maintained at 100° C. Samples were taken periodically and the volatile content of the sample was recorded to monitor the extent of reaction. A volatile content of 17.5% was measured after 24 hours of reaction.

Example 5

Octamethylcyclotetrasiloxane (20 grams, 0.067 moles), silanol terminated poly(dimethylsiloxane) (80 grams) and hexamethyldisiloxane (0.82 grams, 5.3 mmol) are taken in a round bottom flask fitted with a water cooling condenser. The catalyst triazabicylo[4,4,0]dec-5-ene (0.4 grams) was added. The reaction mixture was kept in an oil bath maintained at 100° C. Samples were taken periodically and the volatile content of the sample was recorded to monitor the extent of reaction. A volatile content of 20.1% was measured after 2 hours of reaction.

Comparative Example 1

Octamethylcyclotetrasiloxane (100 grams, 0.335 moles) and hexamethyldisiloxane (0.82 grams, 5.3 mmol) were taken in a round bottom flask fitted with a water cooling condenser. The reaction was performed with a widely used acid type catalyst (0.4 wt. %). The reaction mixture was kept in an oil bath maintained at 100° C. Samples were taken periodically and the volatile content of the sample was recorded to monitor the extent of reaction. A volatile content of 10.2% was measured after 4 hours of reaction.

Comparative Example 2

Octamethylcyclotetrasiloxane (100 grams, 0.335 moles) and hexamethyldisiloxane (0.82 grams, 5.3 mmol) were taken in a round bottom flask fitted with a water cooling condenser. The reaction was performed with a widely used base type catalyst (0.4 wt. %). The reaction mixture was kept in an oil bath maintained at 100° C. Samples were taken periodically and the volatile content of the sample was recorded to monitor the extent of reaction. A volatile content of 18.6% was measured after 5 hours of reaction.

TABLE 1

| | Ring opening polymerization of siloxanes. | | | | |
|---|---|---|---|---|---|
| Example | Catalyst system | Loading (wt. %) | Temperature (° C.) | Time (h) | % Volatile content |
| 1 | TBD | 0.4 | 100 | 4 | 14 |
| 2 | TBD | 0.1 | 120 | 24 | 28.1 |
| 3 | Aqueous solution of TBD | 0.4 | 100 | 8 | 15.5 |
| 4 | Methanolic solution of TBD | 0.4 | 100 | 24 | 17.5 |
| 5 | TBD | 0.4 | 100 | 2 | 20.1 |
| Comp. Ex. 1 | Acid type catalyst | 0.4 | 100 | 4 | 10.2 |
| Comp. Ex. 2 | Basic type catalyst | 0.4 | 100 | 5 | 18.6 |

Embodiments of the present technology have been described above and modification and alterations may occur to others upon the reading and understanding of this specification. The claims as follows are intended to include all modifications and alterations insofar as they come within the scope of the claims or the equivalent thereof.

What is claimed is:

1. A process for the ring opening polymerization of a cyclosiloxane comprising contacting a cyclosiloxane with a bicyclic guanidine compound.

2. The process of claim 1, wherein the bicyclic guanidine is of the formula:

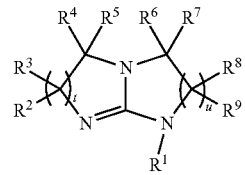

where $R^1$, $R^2$, $R^3$, $R^4$, $R^5$, $R^6$, $R^7$, $R^8$, and $R^9$ are independently chosen from hydrogen, a linear or branched alkyl comprising 1 to 10 carbon atoms, an aromatic group comprising 6 to 12 carbon atoms, or one or more of the $R^2$-$R^9$ may be eliminated and replaced with a double bond between successive carbon atoms; and t and u are independently 1-5.

3. The process of claim 2, wherein the bicyclic guanidine compound is chosen from a compound of the formulas:

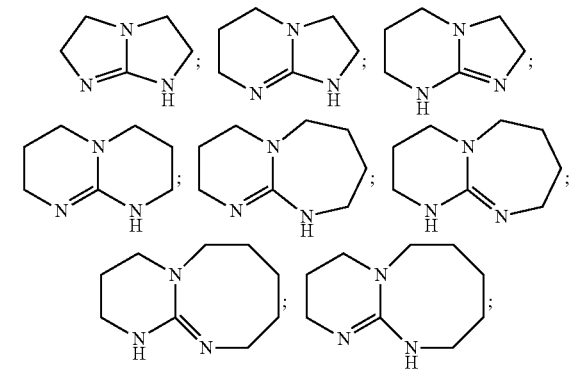

or a combination of two or more thereof.

4. The process of claim 1, comprising a bicyclic guanidine compound of the formula:

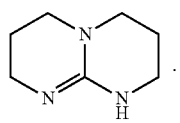

5. The process of claim 1, wherein the bicyclic guanidine is present in an amount of from about 0.05 weight percent to about 5 weight percent based on the total weight of the cyclosiloxane.

6. The process of claim 1, wherein the bicyclic guanidine is present in an amount of from about 0.1 weight percent to about 0.4 weight percent based on the total weight of the cyclosiloxane.

7. The process of claim 1, wherein the cyclosiloxane is of the formula $(R^{10}R^{11}SiO)_n$, wherein $R^{10}$ and $R^{11}$ are independently chosen from hydrogen or an optionally substituted alkyl, alkenyl, aryl, alkaryl or aralkyl group having up to 8 carbon atoms, n denotes an integer with a value of from 3 to 12.

8. The process of claim 1, wherein the cyclosiloxane is chosen from octamethyl cyclotetrasiloxane (D4), hexamethylcyclotrisiloxane (D3), octaphenylcyclotetrasiloxane, tetramethylcyclotetrasiloxane, tetramethyltetravinylcyclotetrasiloxane, hexamethyl-1,1-diphenylcyclotetrasiloxane, decamethyl pentacyclosiloxane, cyclopenta (methylvinyl) siloxane, cyclotetra(phenylmethyl) siloxane, cyclopenta methylhydrosiloxane, or a combination of two or more thereof.

9. The process of claim 1 wherein the cyclosiloxane is chosen from two or more cyclosiloxanes, where the two or more cyclosiloxanes have a different ring size from each other.

10. The process of claim 9 comprising a mixture of ocatmethylcycol-tetrasiloxane and decamethylcyclopentasiloxane.

11. The process of claim 1, wherein the reaction comprises an endblocker material.

12. The process of claim 11, wherein the endblocker material is chosen from hexamethyl di siloxane; octamethyltrisiloxane; decamethyltetrasiloxane; dodecamethylpentasiloxane; tetradecamethylhexasiloxane; hexadecamethylheptasiloxane, or a combination of two or more thereof.

13. The process of claim 1 further comprising deactivating the catalyst.

14. The process of claim 13, wherein deactivating the catalyst comprises: treating the product with water; bubbling carbon dioxide through the product; treating the product with a material to neutralize the catalyst, or a combination of two or more thereof.

15. The process of claim 13 further comprising filtering the reaction mixture.

16. The process of claim 1, wherein the reaction further comprises a silanol terminated poly(dimethylsiloxane).

* * * * *